United States Patent
Yasui

(10) Patent No.: US 11,518,383 B2
(45) Date of Patent: Dec. 6, 2022

(54) TRAVEL REFERENCE LINE DETERMINATION SYSTEM AND AUTOMATIC DRIVING SYSTEM

(71) Applicant: HONDA MOTOR CO., LTD., Tokyo (JP)

(72) Inventor: Yuji Yasui, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 995 days.

(21) Appl. No.: 16/250,533

(22) Filed: Jan. 17, 2019

(65) Prior Publication Data
US 2019/0225216 A1 Jul. 25, 2019

(30) Foreign Application Priority Data

Jan. 23, 2018 (JP) ............................. JP2018-008918

(51) Int. Cl.
*B60W 30/10* (2006.01)
*G05D 1/02* (2020.01)
(Continued)

(52) U.S. Cl.
CPC ........... *B60W 30/10* (2013.01); *G05B 13/027* (2013.01); *G05D 1/0212* (2013.01); *G06F 17/10* (2013.01)

(58) Field of Classification Search
CPC ............ B60W 30/10; B60W 50/0097; B60W 50/0098; B60W 60/001;
(Continued)

(56) References Cited

U.S. PATENT DOCUMENTS

| 5,233,526 A | 8/1993 | Detriche et al. |
| 2001/0041953 A1 | 11/2001 | Jitsukata et al. |
| 2017/0225686 A1* | 8/2017 | Takaso ................ G05D 1/0219 |

FOREIGN PATENT DOCUMENTS

| CN | 103914985 A | 7/2014 |
| CN | 107031631 A | 8/2017 |

(Continued)

OTHER PUBLICATIONS

Office Action dated Nov. 30, 2021, issued in counterpart CN application No. 201811453197.9, with English translation. (14 ages).

(Continued)

*Primary Examiner* — Rami Khatib
(74) *Attorney, Agent, or Firm* — WHDA, LLP

(57) ABSTRACT

There is provided a travel reference line determination system and an automatic driving system capable of determining a travel reference line of a vehicle appropriately even under conditions where information representing the track environment of the vehicle is hard to get. An ECU of an automatic driving system calculates a model y coordinate value ymw_i using a map in FIG. 4 (Step 12), calculates an estimated y coordinate value y_i using track environment data D_info (Step 11), calculates curvature C so that an error between the model y coordinate value ymw_i and the estimated y coordinate value y_i may be minimized (Step 18), calculates a travel trajectory Xf using the curvature C (Step 4), and executes automatic driving control using the travel trajectory Xf (Steps 31 to 33).

11 Claims, 13 Drawing Sheets

(51) Int. Cl.
*G05B 13/02* (2006.01)
*G06F 17/10* (2006.01)

(58) Field of Classification Search
CPC ......... B60W 2050/0031; B60W 30/16; B60W 30/09; B60W 30/095; B60W 40/00; B60W 40/02; G05B 13/027; G05D 1/0212; G06F 17/10
See application file for complete search history.

(56) References Cited

FOREIGN PATENT DOCUMENTS

| | | |
|---|---|---|
| CN | 107284442 A | 10/2017 |
| JP | 2017-137001 A | 8/2017 |

OTHER PUBLICATIONS

Office Action dated Jun. 25, 2019, issued in counterpart JP application No. 2018-008918, with English translation. (11 pages).
Office Action dated Sep. 10, 2019, issued in counterpart JP application No. 2018-008918, with English translation. (6 pages).

\* cited by examiner

TRAVEL TRAJECTORY CALCULATION

CURVATURE CALCULATION

AUTOMATIC DRIVING CONTROL

TRAVEL REFERENCE LINE DETERMINATION SYSTEM AND AUTOMATIC DRIVING SYSTEM

CROSS REFERENCES TO RELATED APPLICATIONS

The present application claims priority under 35 U.S.C. § 119 to Japanese Patent Application No. 2018-008918, filed Jan. 23, 2018, entitled "TRAVEL REFERENCE LINE DETERMINATION SYSTEM AND AUTOMATIC DRIVING SYSTEM." The contents of this application are incorporated herein by reference in their entirety.

TECHNICAL FIELD

The present disclosure relates to a travel reference line determination system that determines a travel reference line being any one of a future travel trajectory of a vehicle, boundary lines of a track, and boundary lines of a travel lane, and to an automatic driving system.

BACKGROUND

A vehicle control system described in Japanese Patent Application Publication No. 2017-137001 has been heretofore known. This vehicle control system is to execute steering support control and equipped with a stereo camera. This vehicle control system acquires distance information by a stereo matching method using the stereo camera, and a lane line in the advancing direction of a vehicle is calculated based on this distance information in the following manner.

Specifically, a two-dimensional coordinate system with the advancing direction as its x axis and the lateral direction as its y axis is defined with the location of the vehicle used as a reference and the lane line is approximated by a quadratic curve. At the same time, the method of least squares is applied to a data group constituting the lane line in the distance information and a model parameter of the approximated quadratic curve is identified to calculate the lane line. Then, steering support control is executed using the lane line thus calculated.

SUMMARY

Recent typical automatic driving systems for executing vehicle automatic driving determine their travel trajectory at the time of traveling on a curve road by using the lane line calculation method of Japanese Patent Application Publication No. 2017-137001 described above. However, in the case of the calculation method of Japanese Patent Application Publication No. 2017-137001, because the lane line, i.e., the travel trajectory is approximated by the quadratic curve and the model parameter of this quadratic curve is identified by the method of least squares, there is a problem that the apex of the quadratic curve cannot be set appropriately and therefore the travel trajectory cannot be calculated appropriately.

For example, depending on the state of information representing track environment such as distance information, the travel trajectory of the approximated quadratic curve is sometimes calculated in a state as illustrated by a solid line in FIG. 13 to be described later and largely deviates from an appropriate travel trajectory (a curve illustrated by a broken line in the drawing) along which the vehicle is supposed to travel. As a result, the vehicle tries to travel along the travel trajectory of the approximated quadratic curve, and thus might travel along an inappropriate and unstable trajectory such as one along which the vehicle should travel rightward once and then turn around to the left.

In addition, under conditions where the level of acquisition of the information representing the track environment decreases, e.g., under adverse weather conditions, such as fog, rain, and snow, or conditions, such as puddles and shaded areas, where the road surface itself is hard to identify, the travel trajectory of the approximated quadratic curve is sometimes calculated in a state as illustrated by a solid line in FIG. 14 to be described later, for example. In this case, the vehicle might become unable to travel and stop.

Thus, it is preferable to provide a travel reference line determination system and an automatic driving system capable of determining a travel reference line of a vehicle appropriately even under conditions where information representing the track environment of the vehicle is hard to get.

For example, one aspect of the present disclosure provides a travel reference line determination system 1 for determining a travel reference line (travel trajectory Xf, left and right boundary lines LL, LR) that is used as a reference when a vehicle 3 travels, the travel reference line determination system being characterized by including: a line model value calculation means (ECU 2, model y coordinate value calculator 11) configured to calculate a line model value (model y coordinate value ymw_i) using a travel reference line model (FIG. 4) obtained by modeling of the travel reference line, the line model value representing a mode where the travel reference line extends; a track environment data acquisition means (travel environment detection device 4) configured to acquire track environment data D_info representing track environment including a track of the vehicle 3; a line estimate value calculation means (ECU 2, estimated track position calculator 10) configured to calculate a line estimate value (estimated y coordinate value y_i) using the track environment data D_info, the line estimate value representing a mode where the travel reference line extends; an arc defining parameter calculation means (ECU 2, evaluation function value calculator 12, curvature calculator 30) configured to calculate an arc defining parameter (curvature C) so as to minimize an error between the line model value (model y coordinate value ymw_i) and the line estimate value (estimated y coordinate value y_i), the arc defining parameter defining an arc; and a travel reference line determination means (ECU 2, travel trajectory calculator 40) configured to determine the travel reference line (travel trajectory Xf, left and right boundary lines LL, LR) using the arc defining parameter (curvature C) so that the travel reference line has an arc shape, characterized in that the travel reference line model is a model including the arc defining parameter (curvature C) as input and the line model value (model y coordinate value ymw_i) as output, and the line model value calculation means calculates the line model value (model y coordinate value ymw_i) using the arc defining parameter (curvature C) calculated by the arc defining parameter calculation means and the travel reference line model.

According to this travel reference line determination system, the arc defining parameter defining the arc is calculated so that the error between the line model value and the line estimate value may be minimized, and the travel reference line is determined using the arc defining parameter so as to have an arc shape. In this case, because the line estimate value is calculated using the track environment data representing the track environment including the track of the vehicle, the accuracy of calculation thereof might decrease under conditions where an actual state of the track environment of the vehicle is hard to get, e.g., under adverse weather conditions, such as fog, rain, and snow, or conditions, such as puddles and shaded areas, where the road surface itself is hard to identify. On the other hand, since the line model value is calculated using the travel reference line model obtained by modeling of the travel reference line, even under the conditions where the track environment actual state is hard to get, it can be calculated without being influenced by such conditions. In addition, the travel reference line model is a model including the arc defining parameter as input and the line model value as output, and the line model value is calculated using this travel reference line model and the arc defining parameter that is calculated so that the error between the line model value and the line estimate value may be minimized; this means that the line model value is calculated while being corrected, as calculation proceeds, so that the error between itself and the line estimate value may be minimized. As a result, it is possible to fit the arc defined by the arc defining parameter, i.e., the arcuate travel reference line to the extension mode of the line estimate value appropriately. Thanks to the above, even under the conditions where information representing the track environment is hard to get, it is possible to determine the travel reference line, used when the vehicle travels, accurately so that this line may have an arc shape while inhibiting influence of such conditions.

In the present disclosure, it is preferable that the travel reference line is a future travel trajectory Xf of the vehicle 3, and the line model value calculation means calculates the line model value of the future travel trajectory Xf (model y coordinate value ymw_i) so that the extension mode of the line model value may be in parallel with the advancing direction of the vehicle 3 and at least passes through a range in which the vehicle 3 is present when the future travel trajectory Xf is determined.

According to this travel reference line determination system, since the line model value of the future travel trajectory is calculated so that the extension mode of the line model value may be in parallel with the advancing direction of the vehicle and at least passes through the range in which the vehicle is present when the future travel trajectory is determined, it is possible to determine the future travel trajectory of the vehicle so that the future travel trajectory may not deviate from the range in which the vehicle is present when this trajectory is determined. Thereby, when the vehicle is made to travel along this travel trajectory, for example, it is possible to prevent the vehicle from traveling with unstable behavior and thus achieve a stable travel state.

In the present disclosure, it is preferable that the travel reference line is the track of the vehicle 3 and one of boundary lines LL, LR of a travel lane of the vehicle 3, and the line model value calculation means calculates the line model value of one of the boundary lines so that a tangent line to the line model value may extend in parallel with the central line of the vehicle 3 at a lateral side of the vehicle 3 at the time when one of the boundary lines is determined.

According to this travel reference line determination system, since the line model value of the track of the vehicle and one of the boundary lines of the travel lane of the vehicle is calculated so that the tangent line to the line model value may extend in parallel with the central line of the vehicle at the lateral side of the vehicle at the time when one of the boundary lines is determined, it is possible to determine one of the boundary lines appropriately while preventing it from overlapping with the vehicle. Thereby, when the travel state of the vehicle is controlled using one of these boundary lines, for example, it is possible to prevent the vehicle from traveling with unstable behavior and thus achieve a stable travel state.

In the present disclosure, it is preferable that the arc defining parameter calculation means calculates the arc defining parameter (curvature C) using multiple line estimate values (estimated y coordinate value y_i) that are calculated during the time from the past to the present.

According to this travel reference line determination system, the arc defining parameter is calculated using the multiple line estimate values that are calculated during the time from the past to the present. Accordingly, even under conditions where the error at the time of acquisition of the track environment temporarily surges and the calculation error of the line estimate value temporarily surges, it is possible to calculate the arc defining parameter stably and accurately while inhibiting the influence of these conditions, and thus determine the travel reference line accurately.

In the present disclosure, it is preferable that the arc defining parameter calculation means evaluates a direction in which the error changes at the time when a value (signal addition curvature Cw) including the arc defining parameter (curvature C) changes, and calculates the arc defining parameter (curvature C) based on the evaluation result.

The extremum seeking algorithm using an evaluation function value is a typical method of calculating a parameter so as to minimize an error, and the slant characteristics of the evaluation function value needs to be set/determined previously in this extremum seeking algorithm. However, under conditions where the vehicle travels while curving, previously setting/determining such slant characteristics of the evaluation function value is difficult, and therefore the typical extremum seeking algorithm cannot be used. On the other hand, according to this travel reference line determination system, the direction in which the error changes at the time when the value including the arc defining parameter changes is evaluated, and the arc defining parameter is calculated based on the evaluation result. Thus, it is possible to calculate the arc defining parameter so as to minimize the error between the line model value of the travel reference line and the line estimate value and thus determine the travel reference line accurately even under conditions where the vehicle travels while curving, i.e., previously setting/determining the slant characteristics of the evaluation function is impossible.

In the present disclosure, it is preferable that the travel reference line model is configured as a model including a signal addition parameter (signal addition curvature Cw), obtained by adding a predetermined reference signal value w to the arc defining parameter (curvature C), as input and the line model value (model y coordinate value ymw_i) as output, the arc defining parameter calculation means has: an evaluation function value calculation means (ECU 2, evaluation function value calculator 12) configured to calculate an evaluation function value J for evaluating the error; a fluctuation component extraction means (ECU 2, washout filter 31) configured to extract a fluctuation component of the evaluation function value J; and a correlation value calculation means (ECU 2, moving average filter 34) configured to calculate a correlation value (moving average value Pmav) that takes a value of zero when the error is the smallest, by subjecting a multiplication value (intermediate value Pc), obtained by multiplying the fluctuation component by the predetermined reference signal value, to predetermined filtering processing, and the arc defining parameter (curvature C) is calculated so that the correlation value can take a value of zero.

According to this travel reference line determination system, the evaluation function value for evaluating the error is calculated, the correlation value that takes a value of zero when the error is the smallest is calculated by subjecting the multiplication value, obtained by multiplying the fluctuation component for extracting the fluctuation component of the evaluation function value by the reference signal value, to the predetermined filtering processing, and the arc defining parameter is calculated so that the correlation value can take a value of zero. In this way, it is possible to calculate the arc defining parameter so that the error between the line model value of the travel reference line and the line estimate value may be minimized without setting/determining the slant characteristics of the evaluation function value in advance. Thus, it is possible to calculate the arc defining parameter accurately and thus calculate the travel reference line accurately even under conditions where the vehicle travels while curving, i.e., previously setting/determining the slant characteristics of the evaluation function value is impossible.

An automatic driving system of the present disclosure is characterized by, for example, including the travel reference line determination system according to anyone of the above, characterized in that the travel state of the vehicle 3 is controlled (Steps 31 to 33) using the travel reference line Xf determined by the travel reference line determination system 1.

According to this automatic driving system, as described above, even under conditions where the actual track environment of the vehicle is hard to get, it is possible to determine the travel reference line accurately while inhibiting influence of such conditions, and thus control the travel state of the vehicle accurately and improve this control accuracy using this travel reference line. In the above explanation of the exemplary embodiment, specific elements with their reference numerals are indicated by using brackets. These specific elements are presented as mere examples in order to facilitate understanding, and thus, should not be interpreted as any limitation to the accompanying claims.

DETAILED DESCRIPTION

Hereinbelow, a travel reference line determination system and an automatic driving system according to an embodiment of the present disclosure is described with reference to the drawings. Note that, an automatic driving system of this embodiment also works as the travel reference line determination system; thus, in the following description, in addition to the description of the automatic driving system, the function and configuration of the travel reference line determination system are also described in the description thereof.

Figure 1:
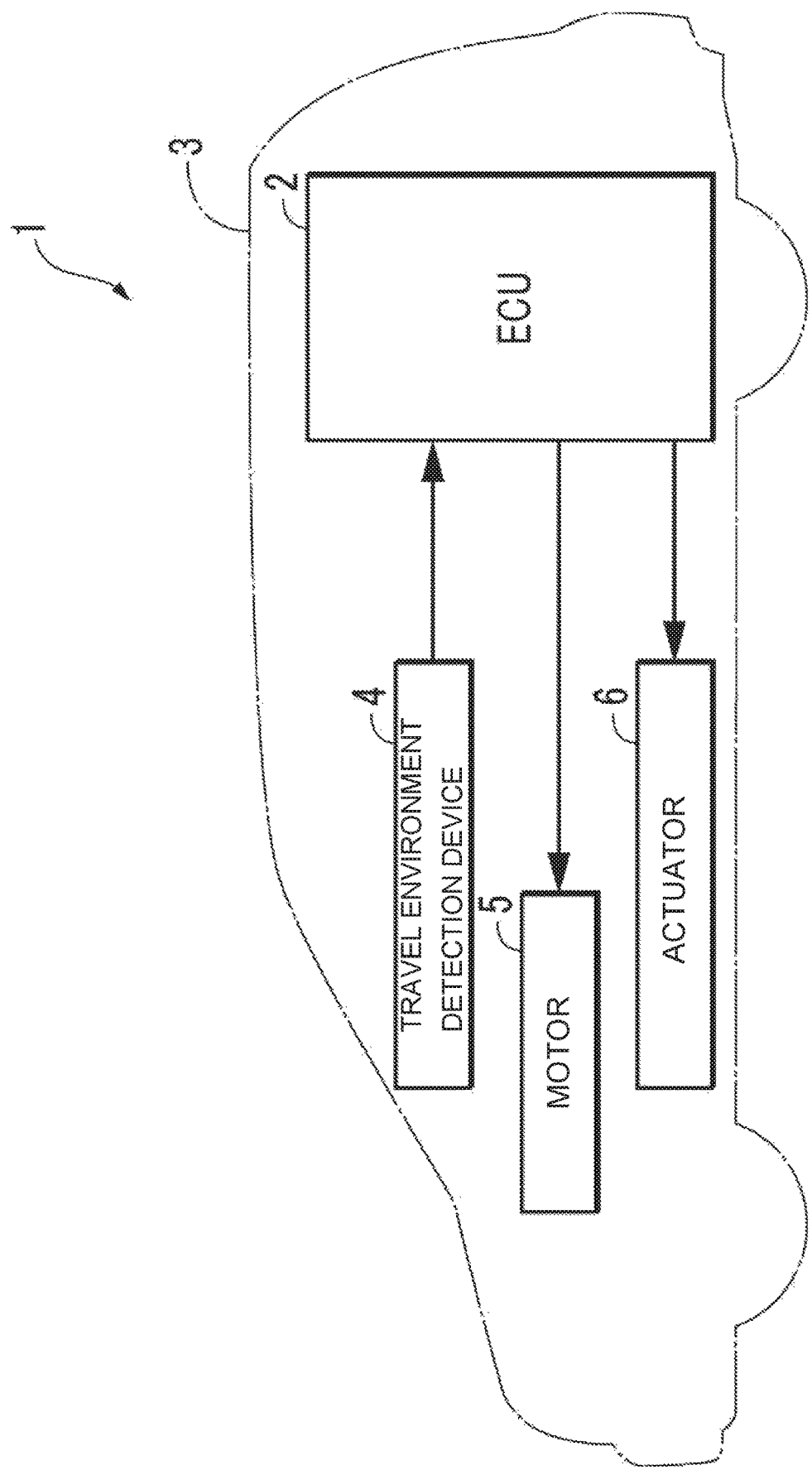
FIG. 1 is a diagram schematically illustrating the configuration of a travel reference line determination system and an automatic driving system according to an embodiment of the present disclosure and a vehicle that employs them.

As illustrated in FIG. 1, this automatic driving system 1 is employed in a four-wheel vehicle 3 and equipped with an ECU 2. Note that, in the following description, the vehicle 3 equipped with this automatic driving system 1 is referred to as a "vehicle 3".

A travel environment detection device 4, a motor 5, and an actuator 6 are electrically connected to the ECU 2. This travel environment detection device 4 (track environment data acquisition means) is constituted of a camera, a milliwave radar, a laser radar, a sonar, a GPS, and various sensors, and configured to output, to the ECU 2, track environment data D_info representing the position of the vehicle 3 and track environment (e.g. traffic environment and participants of the traffic) present in the direction in which the vehicle 3 travels.

As will be described later, on the basis of the track environment data D_info sent from the travel environment detection device 4, the ECU 2 recognizes the position of the vehicle 3 and track environment around the vehicle 3, and determines a future travel trajectory of the vehicle 3 which is a travel reference line thereof.

The motor 5 is constituted of an electric motor, for example. As will be described later, once determining the future travel trajectory of the vehicle 3, the ECU 2 controls the output of the motor 5 so that the vehicle 3 can travel along this travel trajectory.

In addition, the actuator 6 is constituted of a braking actuator, a steering actuator, and the like. As will be described later, once determining the future travel trajectory of the vehicle 3, the ECU 2 controls the operation of the actuator 6 so that the vehicle 3 can travel along this travel trajectory.

Meanwhile, the ECU 2 is constituted of a microcomputer formed of a CPU, a RAM, a ROM, an E2PROM, an I/O interface, various electric circuits (all of which are not illustrated), and the like. As will be described later, the ECU 2 executes processing such as travel trajectory calculation processing and automatic driving control processing based on data such as the track environment data D_info sent from the travel environment detection device 4 described above.

Note that, in this embodiment, the ECU 2 corresponds to a line model value calculation means, a line estimate value calculation means, an arc defining parameter calculation means, a travel reference line determination means, an evaluation function value calculation means, a fluctuation component extraction means, and a correlation value calculation means.

Next, the functional configuration of the automatic driving system 1 of this embodiment is described with reference to FIG. 2. The automatic driving system 1 is configured to calculate a travel trajectory Xf, used when the vehicle travels on a curve track such as a curved path or a bent path or on a curve travel lane, by a calculation algorithm to be described below. Note that, in the following description, both of the track and travel lane are collectively referred to as a "track", and both of the curve track and curve travel lane are collectively referred to as a "curve track".

Figure 2:
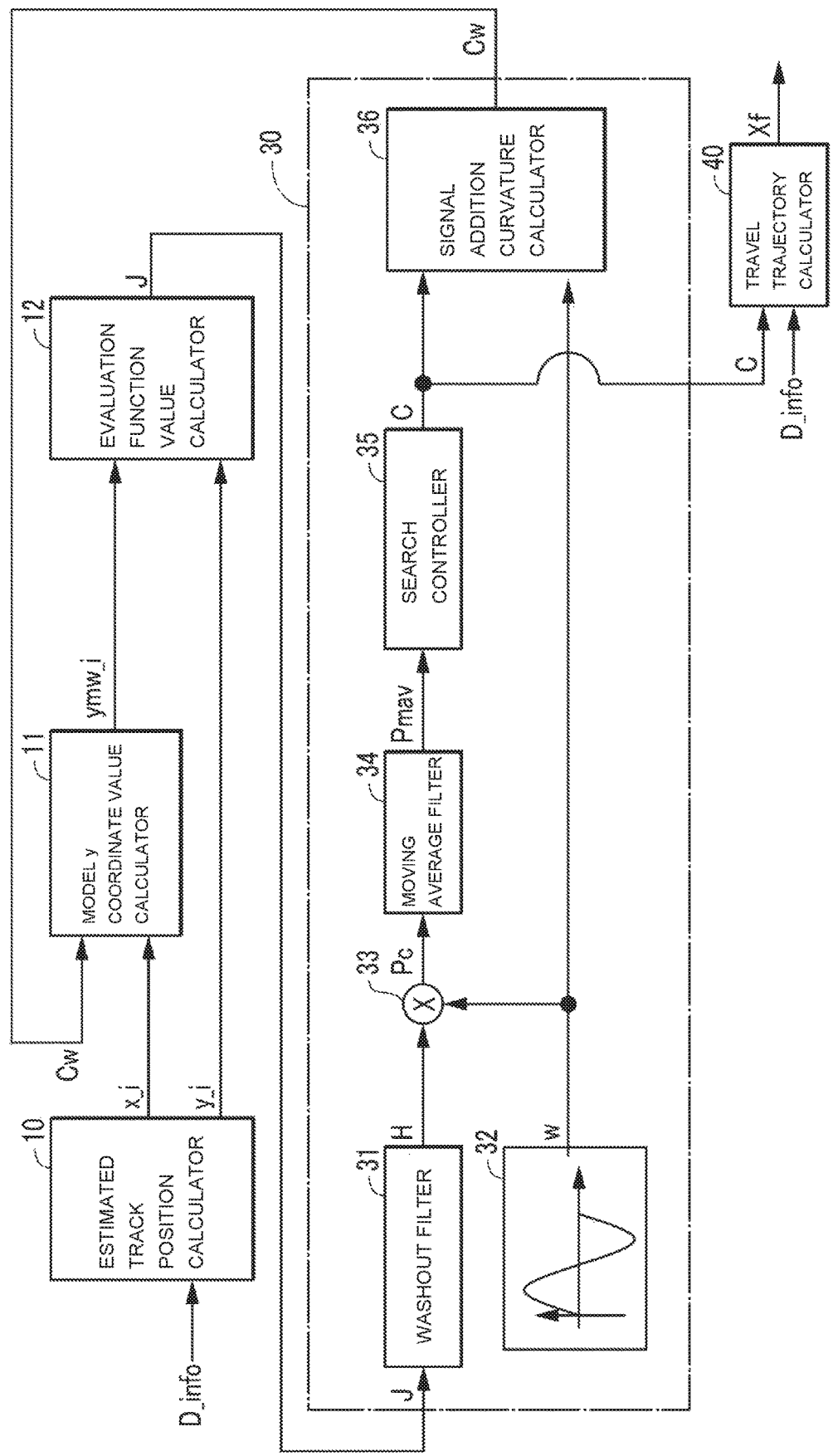
FIG. 2 is a block diagram illustrating the functional configuration of the automatic driving system.

As illustrated in FIG. 2, the automatic driving system 1 includes: an estimated track position calculator 10; a model y coordinate value calculator 11; an evaluation function value calculator 12; a curvature calculator 30; and a travel trajectory calculator 40, and these components 10 to 12, 30, and 40 are specifically constituted by the ECU 2.

Note that, in the following description, for the sake of convenience, the central position of the vehicle 3 is defined as an original point and the longitudinal direction and lateral direction of the vehicle 3 are respectively defined as an x coordinate axis and y coordinate axis, and a y coordinate value located at the left side of the original point is set as a positive value.

The estimated track position calculator 10 (line estimate value calculation means) is configured to calculate n (n is more than one) estimated track positions X_i (i=1 to n) using the track environment data D_info by a method to be described later. In this case, the estimated track positions X_i are calculated as a combination of n estimated x coordinate values x_i and n estimated y coordinate values y_i, and the number of calculated values n is not a constant value but varies depending on factors such as traffic environment and climate condition. Note that, in this embodiment, the estimated track position calculator 10 corresponds to the line estimate value calculation means, and the estimated y coordinate value y_i corresponds to a line estimate value.

In addition, the model y coordinate value calculator 11 is configured to calculate n model y coordinate values ymw_i (i=1 to n) using the n estimated x coordinate values x_i and a signal addition curvature Cw to be described later by a method to be described later. Note that, in this embodiment, the model y coordinate value calculator 11 corresponds to the line model value calculation means, and the model y coordinate value ymw_i corresponds to a line model value.

Besides, the evaluation function value calculator 12 is configured to calculate an evaluation function value J using the n model y coordinate values ymw_i and the n estimated y coordinate values y_i by a method to be described later. Note that, in this embodiment, the evaluation function value calculator 12 corresponds to the arc defining parameter calculation means and the evaluation function value calculation means.

Further, the curvature calculator 30 is configured to calculate a curvature C and the signal addition curvature Cw using the evaluation function value J by a method to be described later. Note that, in this embodiment, the curvature calculator 30 corresponds to the arc defining parameter calculation means, the curvature C corresponds to an arc defining parameter, and the signal addition curvature Cw corresponds to a value including the arc defining parameter and a signal addition parameter.

Furthermore, the travel trajectory calculator 40 is configured to calculate the travel trajectory Xf using the curvature C and the track environment data D_info by a method to be described later. Note that, in this embodiment, the travel trajectory calculator 40 corresponds to the travel reference line determination means, and the travel trajectory Xf corresponds to a travel reference line.

Figure 3:
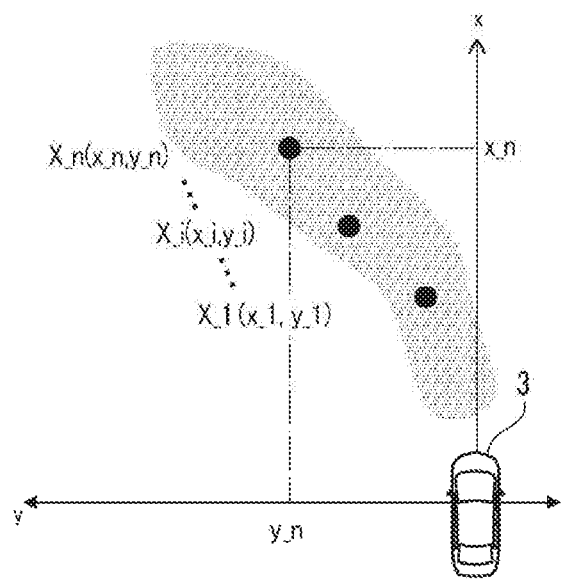
FIG. 3 is a diagram illustrating a travel position calculation example calculated by a travel position calculator.

Next, the above-mentioned estimated track position calculator 10 is described. Note that the following description is provided while taking as an example a case where the curve track is a track bent leftward. The estimated track position calculator 10 calculates n estimated track positions X_i (x_i, y_i) based on the track environment data D_info by a reinforcement learning method using a deep neural network (see FIG. 3). These n estimated track positions X_i (x_i, y_i) are estimate values of the travel lane central position of the vehicle in the curve track, and are calculated as a combination of n estimated x coordinate values x_i (i=1 to n) and n estimated y coordinate values y_i (i=1 to n).

In this case, the reinforcement learning method is a publicly-known method and thus description thereof is omitted. In the case of using the reinforcement learning method, data representing the track characteristics (boundary positions of both ends of the track and positions between the boundary positions) of the curve track located ahead of the vehicle 3 is calculated as data groups with a distribution state as illustrated by dots in FIG. 3. From these data groups, n estimated track positions X_i (x_i, y_i) are calculated as estimate values of the track trajectory that the vehicle 3 should follow in the curve track.

Next, the above-mentioned model y coordinate value calculator 11 is described. The model y coordinate value calculator 11 calculates n model y coordinate values ymw_i (i=1 to n) by searching a map illustrated in FIG. 4 according to the n estimated x coordinate values x_i and the signal addition curvature Cw. In other words, the n model y coordinate values ymw_i are calculated as y coordinate values such that n model track positions Xmw_i (x_i, ymw_i) determined by these model y coordinate values and the n estimated x coordinated values x_i can be located on the arc of the signal addition curvature Cw (see FIG. 5).

Figure 4:
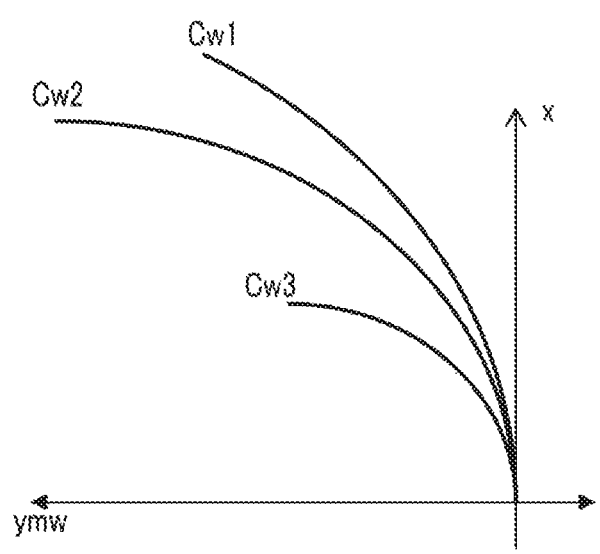
FIG. 4 is a diagram illustrating an example of a map used for calculation of a model y coordinate value ymw.

The map in FIG. 4 corresponds to a model (track reference line model) with the signal addition curvature Cw and x coordinate value x as input and the model y coordinate value ymw as output. In this case, as will be described later, since the signal addition curvature Cw is equal to the sum of the curvature C and reference signal value w, the map in FIG. 4 corresponds to a model with the curvature C, reference signal value w, and x coordinate value x as input. In addition, reference signs Cw1 to Cw3 indicate predetermined values of the signal addition curvature Cw and are set to satisfy 0<Cw1<Cw2<Cw3<1. The reason why the n model y coordinate values ymw_i are calculated using the signal addition curvature Cw will be described later.

Besides, the above-mentioned evaluation function value calculator 12 calculates the evaluation function value J by applying the n model y coordinate values ymw_i and the n estimated y coordinate values y_i to the following equation (1).

[Expression 1]

$$J(k) = \sum_{i=1}^{n} [ymw\_i(k) - y\_i(k)]^2 \quad (1)$$

As shown by this equation (1), the evaluation function value J is calculated as the summation of square errors between the n model y coordinate values ymw_i and the n estimated y coordinate values y_i. Note that each discrete data with reference sign (k) in equation (1) indicates data sampled or calculated in synchronization with a predetermined control cycle ΔT (several tens of milliseconds in this embodiment), and reference sign k (k is a positive integer) indicates control time. In addition, in the following description, reference sign (k) in each discrete data is omitted as needed.

Next, the above-mentioned curvature calculator 30 is described. The curvature calculator 30 calculates the curvature C and the signal addition curvature Cw using the evaluation function value J and, as illustrated in FIG. 2, includes: a washout filter 31; a reference signal generator 32; a multiplier 33; a moving average filter 34; a search controller 35; and a signal addition curvature calculator 36.

The washout filter 31 (fluctuation component extraction means) calculates a filtering value H by the following equation (2).

[Expression 2]

$$H(k)=J(k)-J(k-1) \quad (2)$$

As shown by this equation (2), the filtering value H is calculated as a difference between a current value J(k) and a previous value J(k-1) of the evaluation function value. Besides, the washout filter 31 is designed to pass a frequency component that is included in the evaluation function value J and generated due to the reference signal value w to be described later. In this case, the filtering value H may be calculated using, instead of the above equation (2), a filter algorithm (Butterworth high-pass filter algorithm or band-pass filter algorithm) that passes a frequency component of the reference signal value w to be described later.

Meanwhile, the reference signal generator 32 calculates the reference signal value w by the following equation (3).

[Expression 3]

$$w(k)=A \cdot F \sin(k) \quad (3)$$

Reference sign A in the above equation (3) indicates a predetermined gain and reference sign F sin indicates a sine function value at a predetermined cycle ΔTw. Here, for example, a sine wave, a cosine wave, a triangular wave, a trapezoidal wave, a rectangular wave, and the like may be used as a wave of the reference signal value.

Further, the multiplier 33 calculates an intermediate value Pc by the following equation (4).

[Expression 4]

$$Pc(k)=H(k) \cdot w(k-1) \quad (4)$$

Meanwhile, the moving average filter 34 calculates a moving average value Pmav by the following equation (5). Note that, in this embodiment, the moving average filter 34 corresponds to the correlation value calculation means and the moving average value Pmav corresponds to a correlation value.

[Expression 5]

$$Pmav(k) = \frac{1}{M}\sum_{j=1}^{M} Pc(j) \quad (5)$$

In this equation (5), in order to remove the frequency component of the reference signal value w from the moving average value P mav, the number of samplings M of the moving average value P mav is set so that the product ΔT·M of the number of samplings M and the control cycle ΔT may be equal to the predetermined cycle ΔTw of the sine function value F sin.

Next, the search controller 35 calculates the curvature C by a control algorithm shown in the following equation (6).

[Expression 6]

$$C(k)=C(k-1)+Ksk \cdot Pmav(k) \quad (6)$$

Reference sign Ksk in the above equation (6) indicates a predetermined integral term gain. As is obvious from the above equation (6), the curvature C is calculated, by a feedback control algorithm with integral term only, so as to have a function to converge the moving average value Pmav to zero.

Meanwhile, the signal addition curvature calculator 36 calculates the signal addition curvature Cw by the following equation (7).

[Expression 7]

$$Cw(k)=C(k)+w(k) \quad (7)$$

Meanwhile, the travel trajectory calculator 40 calculates the future travel trajectory Xf as a value illustrated in FIG. 11 or FIG. 12 to be described later, for example, by using the curvature C and the track environment data D_info. Specifically, the travel trajectory Xf is calculated as values in which data points composed of m (m is more than one) x coordinate values xf_j (j=1 to m) and y coordinate values yf_j are associated with control time k.

Next, a description is given of the reason why the signal addition curvature Cw and the curvature C are calculated using the above calculation algorithms and the principle of this calculation. First, as shown in the above equation (1), the evaluation function value J is calculated as the summation of the n square errors between the model y coordinate values ymw_i and the estimated y coordinate values y_i; thus, when the curvature C is calculated so that the evaluation function value J can take a minimal value, the curvature C turns out to be calculated so that the summation of the square errors can take a minimum value. Accordingly, the optimum travel trajectory Xf can be calculated by calculating the travel trajectory Xf using this curvature C.

For this reason, in order to calculate the curvature C so that the evaluation function value J can take a minimal value, the following principle is used in this embodiment. First, because the evaluation function value J is calculated using the signal addition curvature Cw, the evaluation function value exhibits vibrational behavior at a predetermined amplitude due to the characteristics (periodical function) of the reference signal value w included in the signal addition curvature Cw.

Figure 6:
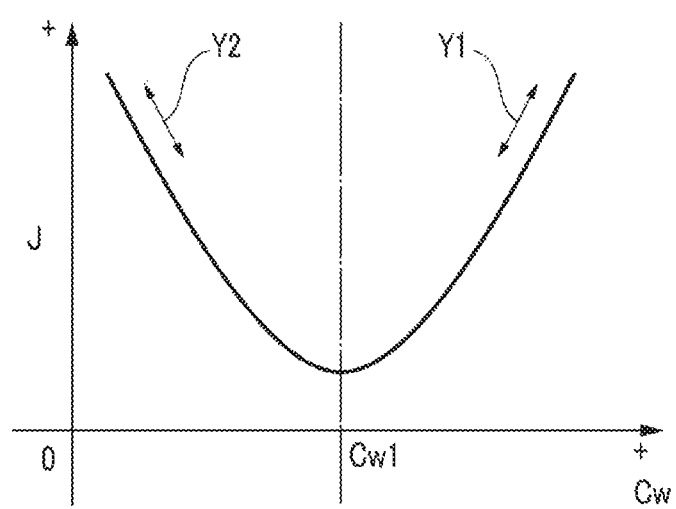
FIG. 6 is an explanatory diagram illustrating the relation between an evaluation function value J and a signal addition curvature Cw.

Here, if the relation between the signal addition curvature Cw and the evaluation function value J is represented as a curve illustrated in FIG. 6, for example, the vibrational behavior of the evaluation function value J due to the reference signal value w has a certain slant as illustrated by arrows Y1, Y2 in the drawing. Note that reference sign Cw1 in FIG. 6 indicates a predetermined value of the signal addition curvature. On the other hand, the moving average value Pmav described above is the moving average value of the product of the filtering value H of the evaluation function value J and the reference signal value w, and thus it turns out to be a value corresponding to the correlation function of the evaluation function value J and the reference signal value w.

Figure 7:
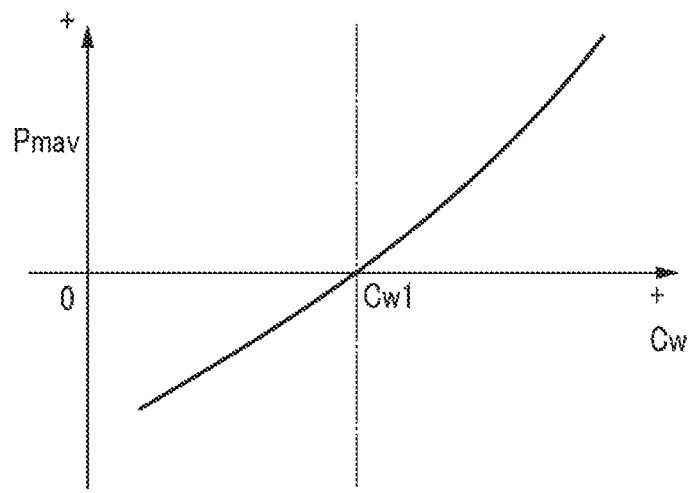
FIG. 7 is an explanatory diagram illustrating the relation between a moving average value Pmav and a signal addition curvature Cw.

For this reason, if the moving average value Pmav corresponding to the correlation function takes a positive value, the slant of the evaluation function value J turns out to be a positive value; on the other hand, if the moving average value Pmav takes a negative value, the slant of the evaluation function value J turns out to be a negative value. In addition, the moving average Pmav is calculated by the above equation (5) and thereby calculated with the frequency component of the reference signal value w removed. Due to the above reasons, the relation between the moving average value Pmav and the signal addition curvature Cw can be represented as a monotonically increasing function as illustrated in FIG. 7, for example. In other words, the moving average value Pmav represents a direction in which the evaluation function value J changes when the signal addition curvature Cw is changed.

Accordingly, what is needed to calculate the signal addition curvature Cw so that the evaluation function value J can take a minimal value (minimum value) is to calculate the moving average value Pmav so that the slant of the function illustrated in FIG. 7 can take a value of zero. In other words, what is needed is to calculate the signal addition curvature Cw, i.e., the curvature C using the feedback control algorithm so that the moving average value Pmav may be converged to zero.

By the above principle, the curvature calculator 30 of this embodiment calculates the curvature C using the feedback control algorithm in equation (6) so that the evaluation function value J can take a minimal value.

Next, travel trajectory calculation processing is described with reference to FIG. 8. The travel trajectory calculation processing is to calculate the future travel trajectory Xf by the above calculation method when the vehicle 3 travels on a curve track, and is executed by the ECU 2 at the predetermined control cycle ΔT described above. Note that various values calculated in the following description are stored in an E2PROM of the ECU 2.

Figure 8:
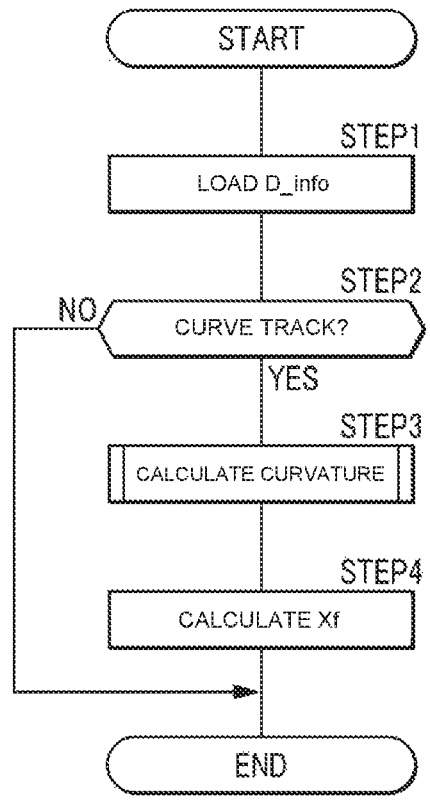
FIG. 8 is a flowchart illustrating travel trajectory calculation processing.

In this travel trajectory calculation processing, first, the track environment data D_info is loaded from the travel environment detection device 4 (FIG. 8/STEP 1).

Next, based on the track environment data D_info, it is judged whether the track located ahead of the vehicle 3 is a curve track (FIG. 8/STEP 2). If the judgment is negative (FIG. 8/STEP 2 . . . NO), the processing terminates.

On the other hand, if the judgment is positive (FIG. 8/STEP 2 . . . YES), curvature calculation processing (FIG. 8/STEP 3) is executed. As described previously, the curvature calculation processing is to calculate the curvature C and the signal addition curvature Cw, and is specifically executed as illustrated in FIG. 9.

Figure 9:
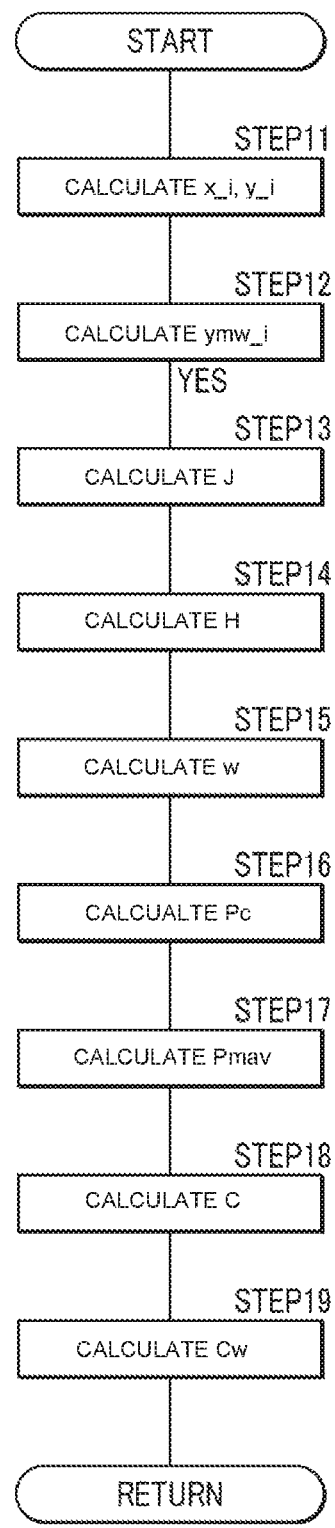
FIG. 9 is a flowchart illustrating curvature calculation processing.

As illustrated in FIG. 9, first, the n estimated track positions X_i (x_i, y_i) are calculated based on the track environment data D_info by the reinforcement learning method using the deep neural network (FIG. 9/STEP 11).

Next, the n model y coordinate values ymw_i are calculated by searching the above-mentioned map illustrated in FIG. 4 according to the n estimated x coordinate values x_i and the signal addition curvature Cw (FIG. 9/STEP 12). In this case, for the signal addition curvature Cw, the previous value (the value calculated at the last control timing) stored in the E2PROM is used.

Next, the evaluation function value J is calculated by the above equation (1) (FIG. 9/STEP 13). Then, the filtering value H is calculated by the above equation (2) (FIG. 9/STEP 14).

Further, the reference signal value w is calculated by the above equation (3) (FIG. 9/STEP 15), and subsequently the intermediate value Pc is calculated by the above equation (4) (FIG. 9/STEP 16).

Next, the moving average value Pmav is calculated by the above equation (5) (FIG. 9/STEP 17), and then the curvature C is calculated by the above equation (6) (FIG. 9/STEP 18).

Subsequently, the signal addition curvature Cw is calculated by the above equation (7) (FIG. 9/STEP 19). Then, the processing terminates.

Returning to FIG. 8, after the curvature calculation processing (FIG. 8/STEP 3) is executed in the above manner, the future travel trajectory Xf is calculated using the curvature C and the track environment data D_info (FIG. 8/STEP 4). Specifically, combinations of the m x coordinate values xf_j and y coordinate values yf_j are calculated as the travel trajectory Xf. Then, the processing terminates.

As described above, in the automatic driving system 1 of this embodiment, the curvature C and the signal addition curvature Cw are updated sequentially at the predetermined control cycle ΔT, and the travel trajectory Xf is updated sequentially at the next calculation timing using the signal addition curvature Cw thus updated.

Next, a description is given of the result of calculation of the travel trajectory Xf of this embodiment by the above calculation method. FIGS. 11 and 12 each illustrate an example of the calculation result of the travel trajectory Xf of this embodiment and, in particular, FIG. 12 illustrates an example of the calculation result of the travel trajectory Xf under conditions, such as rain and fog, in which there is a decrease in the level of acquisition, by the reinforcement learning method, of data representing the characteristics of the track located ahead of the vehicle 3.

In addition, for comparison, FIGS. 13 and 14 each illustrate an example (hereinafter referred to as the "comparative example") of the calculation result of the travel trajectory that is calculated by the method using the quadratic approximate curve described in Japanese Patent Application Publication No. 2017-137001 above under the conditions where data, which is acquired by the reinforcement learning method and represents the characteristics of the track located ahead of the vehicle 3, is the same as that in FIGS. 11 and 12. Here, boundary lines LL, LR located on the left and right of the track and illustrated by a dashed line in FIGS. 11 to 14 indicate the boundary lines of a travel lane of the vehicle 3.

Figure 11:
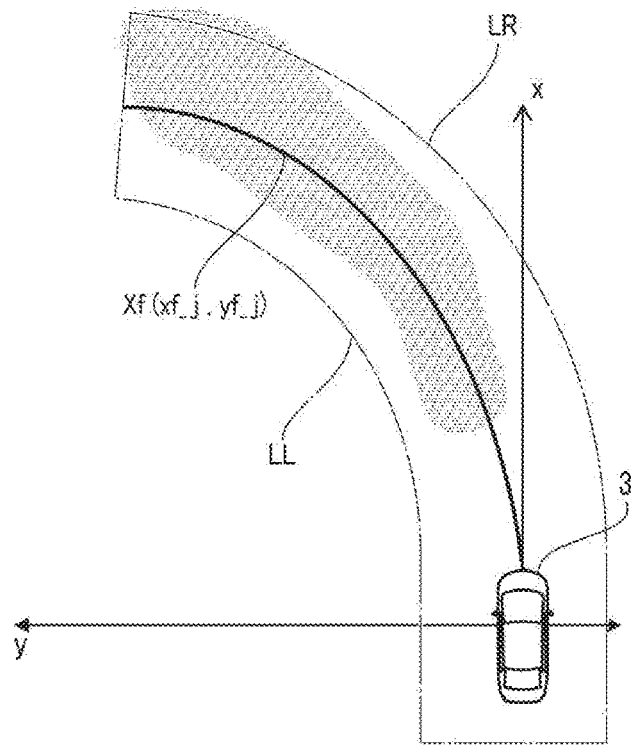
FIG. 11 is a diagram illustrating an example of a determination result of a travel trajectory Xf obtained by the present disclosure.
Figure 13:
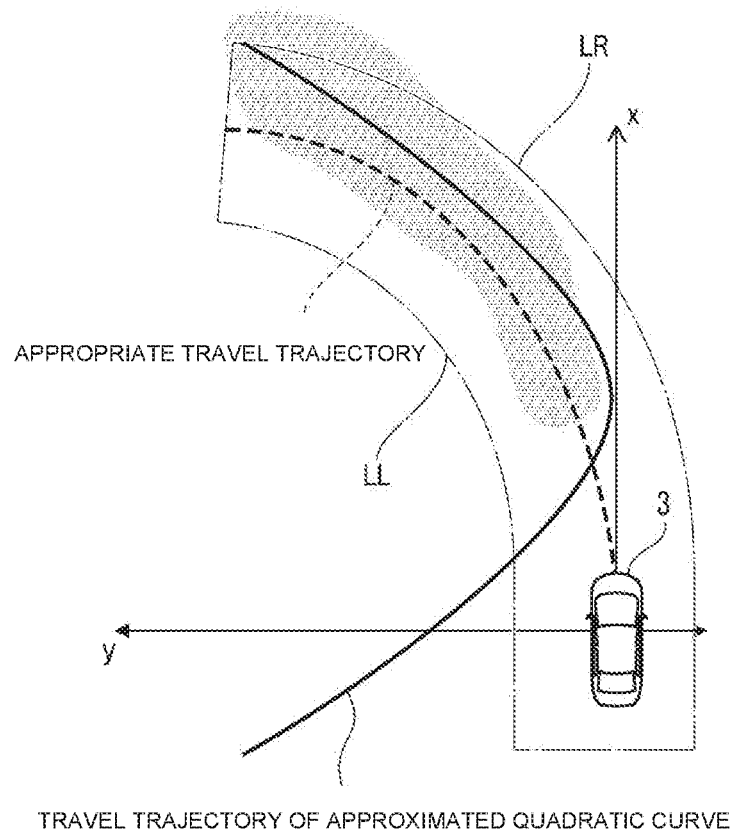
FIG. 13 is a diagram illustrating an example of a determination result of a travel trajectory obtained according to an existing method.

First, FIG. 11 and FIG. 13 are compared. The comparative example illustrated in FIG. 13 shows that the calculation result of the travel trajectory by the quadratic approximate curve not only deviates largely from the range in which the vehicle 3 is present at the time of calculation but also deviates from the travel lane, and that if the vehicle 3 travels along this travel trajectory, it goes into an inappropriate and unstable travel state and cannot travel even in the vicinity of the center of the travel lane.

On the other hand, this embodiment illustrated in FIG. 11 shows that the calculation result of the travel trajectory Xf extends forward in an arc shape from the central point of the vehicle 3 while passing through the vicinity of the center of the travel lane even under the conditions where there is a decrease in the number of data representing the characteristics of the track located ahead of the vehicle 3, and that the vehicle 3 can travel appropriately in the vicinity of the center of the travel lane if it travels along this travel trajectory Xf.

Figure 12:
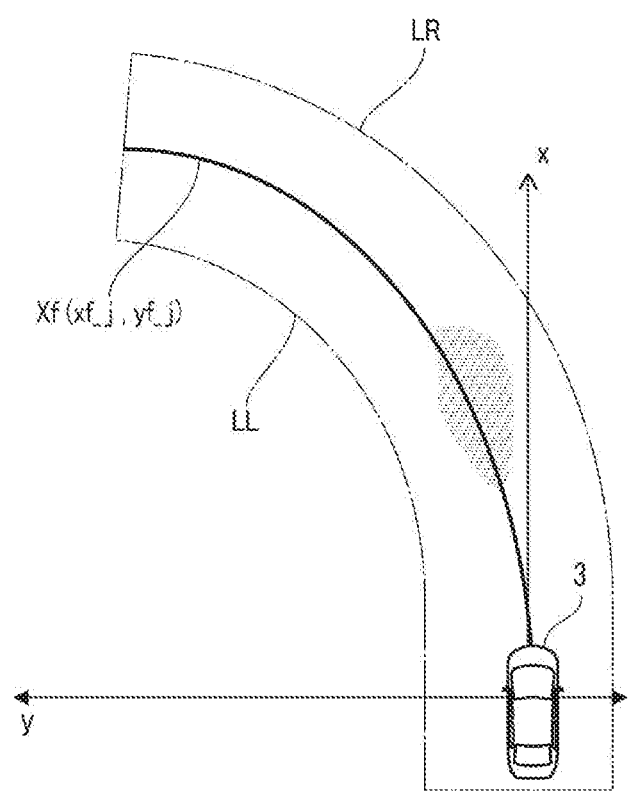
FIG. 12 is a diagram illustrating another example of the determination result of the travel trajectory Xf obtained by the present disclosure.
Figure 14:
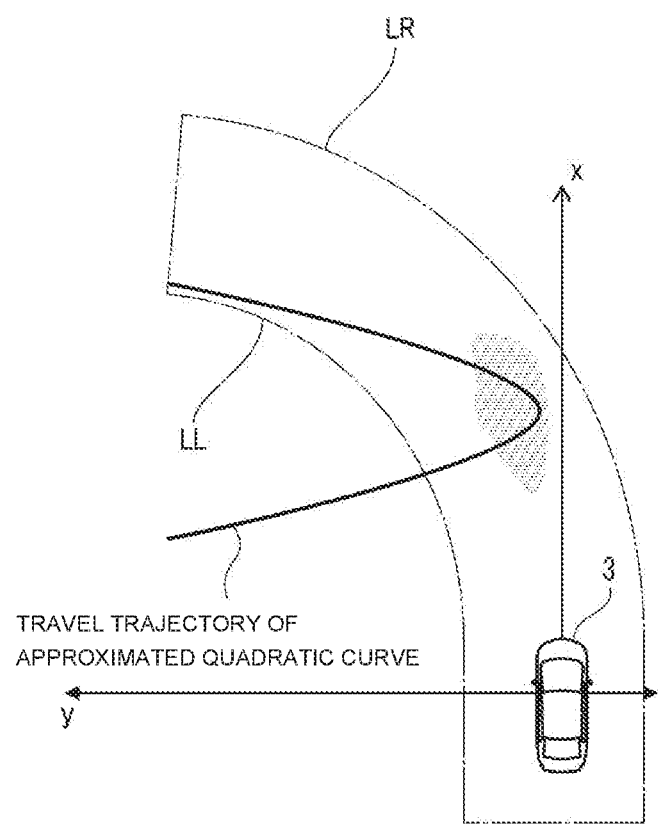
FIG. 14 is a diagram illustrating another example of the determination result of the travel trajectory obtained according to the existing method.

Next, FIGS. 12 and 14 are compared. The comparative example illustrated in FIG. 14 shows that, as the number of data representing the characteristics of the track located ahead of the vehicle 3 decreases due to conditions such as rain and fog, the travel trajectory by the approximated quadratic curve deviates extremely from the travel lane and thus the vehicle 3 might become unable to travel and stop.

On the other hand, this embodiment illustrated in FIG. 12 shows that the travel trajectory Xf extends forward in an arc shape from the central point of the vehicle 3 while passing through the vicinity of the center of the travel lane even under the conditions, such as rain and fog, where there is a decrease in the number of data representing the characteristics of the track located ahead of the vehicle 3, and that the vehicle 3 can travel appropriately in the vicinity of the center of the travel lane if it travels along this travel trajectory Xf.

Next, automatic driving control processing is described with reference to FIG. 10. The automatic driving control processing is to control the vehicle 3 so that it can travel along the travel trajectory Xf calculated in the above manner, and is executed by the ECU 2 at a predetermined control cycle ΔT2 longer than the predetermined control cycle ΔT described above.

Figure 10:
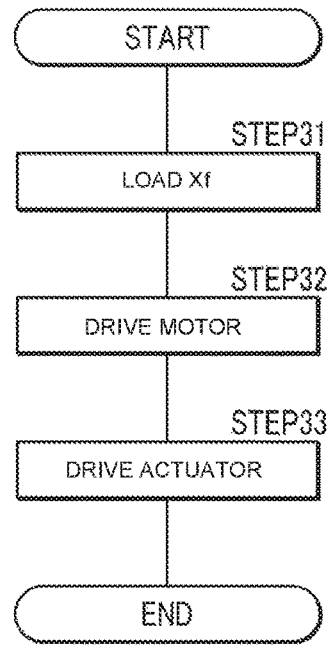
FIG. 10 is a flowchart illustrating automatic driving control processing.

As illustrated in FIG. 10, first, the travel trajectory Xf stored in the E2PROM is loaded (FIG. 10/STEP 31).

Next, the motor 5 is driven so that the vehicle 3 can travel along the travel trajectory Xf thus loaded (FIG. 10/STEP 32).

Subsequently, the actuator 6 is driven so that the vehicle 3 can travel along the travel trajectory Xf thus loaded (FIG. 10/STEP 33). Then, the processing terminates.

As described above, according to the automatic driving system 1 of this embodiment, the n estimated track positions X_i (x_i, y_i) are calculated by the reinforcement learning method based on the track environment data D_info, and the n model y coordinate values ymw_i are calculated by searching the map illustrated in FIG. 4 according to the n estimated x coordinate values x_i and the signal addition curvature Cw. Then, the evaluation function value J is calculated as the summation of the square errors between the estimated y coordinate values y_i and the model y coordinate values ymw_i, and the curvature C is calculated so that the evaluation function value J can take a minimal value (minimum value). In other words, the curvature C is calculated so that an error between the estimated y coordinate values y_i and the model y coordinate values ymw_i may be minimized. Further, the travel trajectory Xf is determined using this curvature C so as to have an arc shape.

In this case, because the estimated track positions X_i (x_i, y_i) are calculated based on the track environment data D_info, the accuracy of calculation thereof might decrease under conditions where an actual state of the track environment of the vehicle 3 is hard to get, e.g., under adverse weather conditions, such as fog, rain, and snow, or conditions, such as puddles and shaded areas, where the road surface itself is hard to identify. On the other hand, since the model y coordinate values ymw_i are calculated by searching the map illustrated in FIG. 4, even under the above conditions where the track environment actual state is hard to get, they can be calculated without being influenced by such conditions.

In addition, the curvature C is calculated so that the error between the estimated y coordinate values y_i and the model y coordinate values ymw_i may be minimized, and the model y coordinate values ymw_i are calculated by using the signal addition curvature Cw obtained by adding the reference signal value w to this curvature C; this means that the model y coordinate values ymw_i are calculated while being corrected, as calculation proceeds, so that the error between themselves and the estimated y coordinate values y_i may be minimized. As a result, by calculating the travel trajectory Xf using such curvature C, it is possible to fit the travel trajectory Xf to the estimated track positions X_i appropriately. Thanks to the above, even under the conditions where the track environment actual state is hard to get, it is possible to determine the travel trajectory Xf, used when the vehicle 3 travels on the curve track, accurately so that this trajectory may have an arc shape while inhibiting influence of such conditions.

Besides, since the center of the vehicle 3 is set as the original point value of each model y coordinate value ymw_i in the map illustrated in FIG. 4, it is possible to determine the travel trajectory Xf of the vehicle 3 so that the travel trajectory may not deviate from the range in which the vehicle 3 is present when this trajectory is determined. Thereby, when the vehicle 3 is made to travel along this travel trajectory Xf, for example, it is possible to prevent the vehicle 3 from traveling with unstable behavior and thus achieve a stable travel state.

Further, as to the curvature C, the moving average value Pmav is calculated by subjecting the product of the filtering value H, obtained by extracting the fluctuation component of the evaluation function value J, and the reference signal value w to the moving average operation, and then the curvature C is calculated so that this moving average value Pmav can take a value of zero. In this case, by calculating the curvature C by the above-mentioned principle using the feedback control algorithm so that the moving average value Pmav may be converged to zero, it is possible to calculate the curvature C so that the evaluation function value J can take a minimal value (minimum value). In other words, it is possible to calculate the curvature C so that the error between the estimated y coordinate values y_i and the model y coordinate values ymw_i may be minimized without setting/determining the slant characteristics of the evaluation function value J in advance. Thus, it is possible to calculate the curvature C accurately even under conditions where the vehicle 3 travels on the curve track, i.e., previously setting/determining the slant characteristics of the evaluation function J is impossible.

Furthermore, because the moving average value Pmav is used, the curvature C is calculated using multiple time-series data of the estimated y coordinate values y_i that are calculated during the time from the past to the present. Accordingly, even under conditions where the error at the time of acquisition of the track environment temporarily surges and the calculation error of the estimated y coordinate values y_i temporarily surges, it is possible to calculate the curvature C stably and accurately while inhibiting the influence of these conditions. Thanks to the above, it is possible to improve the calculation accuracy of the travel trajectory Xf. In addition, since the travel state of the vehicle 3 can be controlled using such travel trajectory Xf with high calculation accuracy, it is possible to improve this control accuracy.

Figure 15:
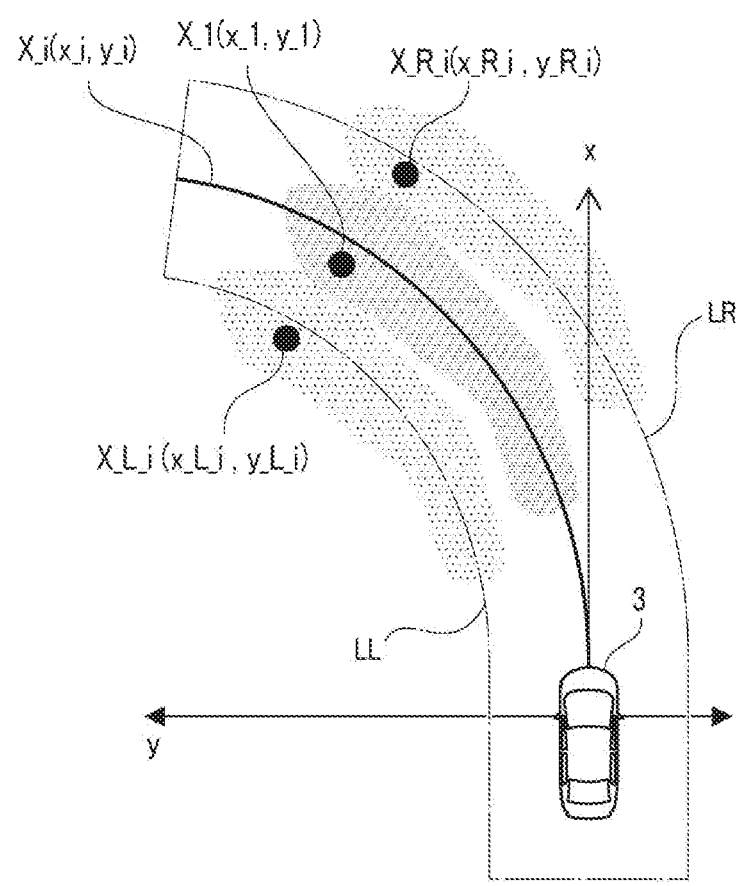
FIG. 15 is an explanatory diagram illustrating a modification of a method of determining the travel trajectory Xf.

Note that, the n estimated track positions X_i (x_i, y_i) may be calculated by the following method instead of the calculation method of the embodiment. Specifically, as illustrated in FIG. 15, by the reinforcement learning method using the deep neural network as in the embodiment, estimate values of the left boundary line LL of the curve track are calculated as n estimated left boundary trajectories X_L_i (x_L_i, y_L_i) [i=1 to n] and estimate values of the right boundary line LR of the curve track are calculated as n estimated right boundary trajectories X_R_i (x_R_i, y_R_i) [i=1 to n].

Then, the n estimated track positions X_i (x_i, y_i) are calculated by the following equations (8) and (9).

[Expression 8]

$$x\_i = \frac{x\_L\_i + x\_R\_i}{2} \quad (8)$$

[Expression 9]

$$y\_i = \frac{y\_L\_i + y\_R\_i}{2} \quad (9)$$

The same operation and effect as that of the embodiment can be achieved also in the case where the n estimated track positions X_i (x_i, y_i) are calculated by the above method.

Meanwhile, although the embodiment shows the example of calculating the n estimated track positions X_i (x_i, y_i) as the line estimate value by the reinforcement learning method using the deep neural network, a line estimate value calculation method is not limited to this method, and any method can be employed as long as the line estimate value can be calculated by this method. For example, the n estimated track positions X_i (x_i, y_i) can be calculated by using feature amount detection image recognition algorithms such as the Speeded Up Robust Features (SURF) algorithm and the Scale Invariant Feature Transform (SIFT) algorithm.

Figure 5:
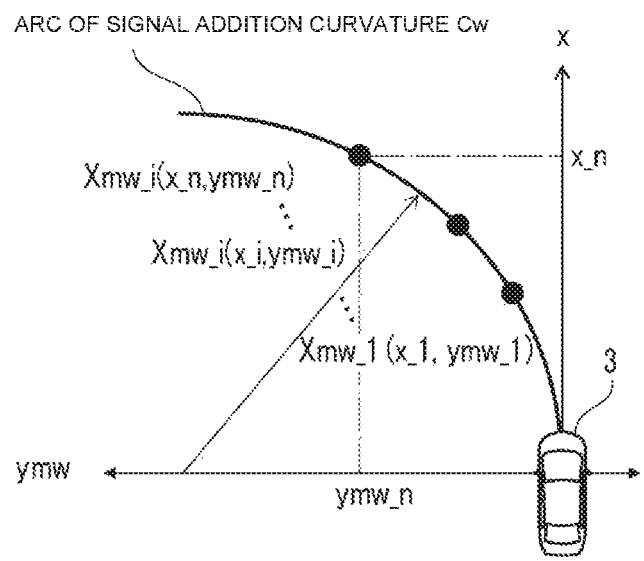
FIG. 5 is a diagram illustrating a calculation example of the model y coordinate value ymw.

Besides, although the embodiment shows the example of calculating the model y coordinate values ymw_i as the line model value of the future travel trajectory so that they may pass through the center of the vehicle 3 at the time when the future travel trajectory is determined as illustrated in FIG. 5, the line model value of the travel trajectory of this embodiment is not limited to this example, and any method can be employed as long as the line model value can be calculated so that its extension mode may be in parallel with the advancing direction of the vehicle 3 and at least pass through the range in which the vehicle 3 is present when the future travel trajectory is determined. For example, in the map of FIG. 4, it is also possible to calculate the model y coordinate value ymw not using the map where the model y coordinate value ymw at the time of x=0 takes a value of zero but using one where the model y coordinate value ymw at the time of x=0 is set at a predetermined negative value or a positive value.

Further, although the embodiment shows the example of calculating the travel trajectory Xf as the travel reference line, one of the left and right boundary lines LL, LR of the curve track may be calculated as the travel reference line instead.

Figure 16:
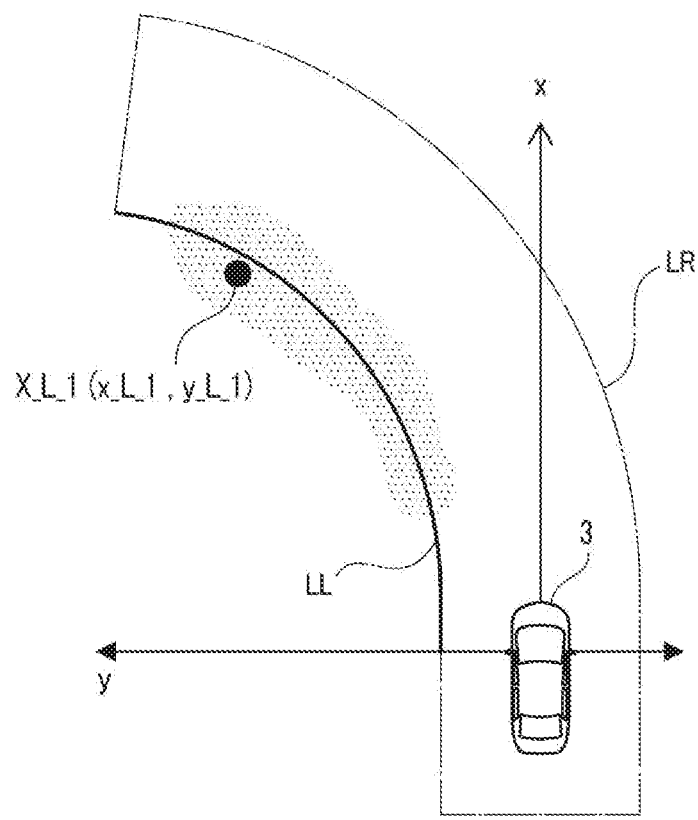
FIG. 16 is an explanatory diagram illustrating a method of determining a left boundary line of a travel lane.

For example, for calculating the left boundary line LL, as illustrated in FIG. 16, the n estimated left boundary trajectories X_L_i (x_L_i, y_L_i) [i=1 to n] can be calculated by the above-described method as an estimate value of the left boundary line LL of the curve track. Meanwhile, the line model value of the left boundary line LL can be calculated so that the tangent line to the line model value may extend in parallel with the central line of the vehicle 3 at the left side of the vehicle 3 at the time when the left boundary line LL is determined. In this case, in the map of FIG. 4 described above, the map obtained by offsetting the model y coordinate value ymw at the time of x=0 to the positive value side can be used, and the amount of offset at this time can be set according to the track environment data D_info.

Figure 17:
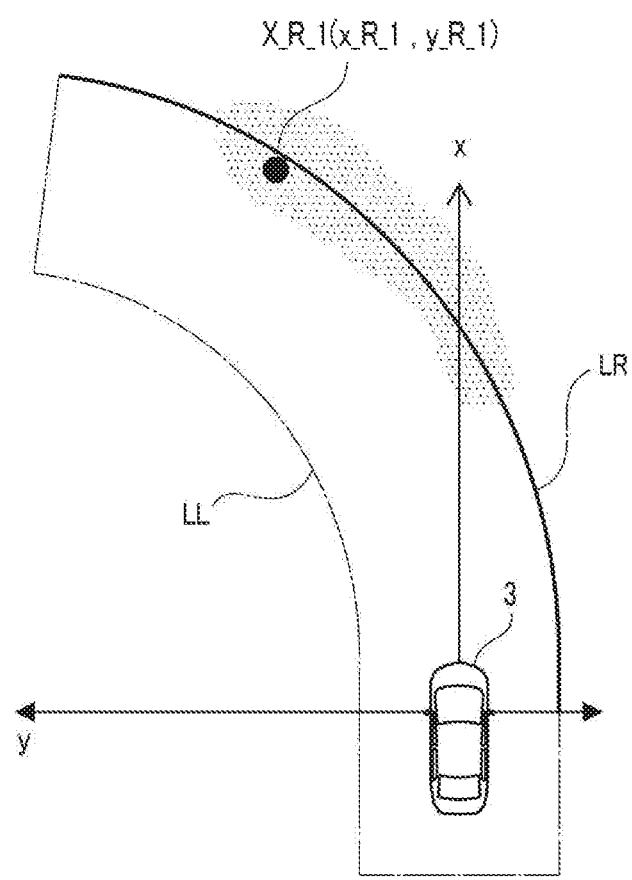
FIG. 17 is an explanatory diagram illustrating a method of determining a right boundary line of the travel lane.

On the other hand, for calculating the right boundary line LR, as illustrated in FIG. 17, the n estimated right boundary trajectories X_R_i (x_R_i, y_R_i) [i=1 to n] can be calculated by the above-described method as an estimate value of the right boundary line LR of the curve track. Meanwhile, the line model value of the right boundary line LR can be calculated so that the tangent line to the line model value may extend in parallel with the central line of the vehicle 3 at the right side of the vehicle 3 at the time when the right boundary line LR is determined. In this case, in the map of FIG. 4 described above, the map obtained by offsetting the model y coordinate value ymw at the time of x=0 to the negative value side can be used, and the amount of offset at this time can be set according to the track environment data D_info.

Further, although the embodiment shows the example of calculating the travel trajectory Xf for traveling on the curve track as the travel reference line, the travel reference line of the present invention is not limited to this, and any travel reference line may be employed as long as it is determined using the arc defining parameter so as to have an arc shape. For example, the travel trajectory at the time when the vehicle travels on an arcuate trajectory in a parking lot may be calculated as the travel reference line. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

The invention claimed is:

1. A travel reference line determination system for determining a travel reference line that is used as a reference when a vehicle travels, comprising:
   a line model value calculation ECU (Electronic Control Unit) configured to calculate a line model value using a travel reference line model obtained by modeling of said travel reference line, said line model value representing a first mode where said travel reference line extends;
   a track environment data acquisition ECU configured to acquire track environment data representing track environment including a track of said vehicle, the track being to be traveled by the vehicle;
   a line estimate value calculation ECU configured to calculate a line estimate value using said track environment data, said line estimate value representing a second mode where said travel reference line extends;
   an arc defining parameter calculation ECU configured to calculate an arc defining parameter so that an error between said line model value and said line estimate value is minimized, said arc defining parameter defining an arc; and
   a travel reference line determination ECU configured to determine said travel reference line using said arc defining parameter so that said travel reference line has an arc shape, wherein said travel reference line model is a model including said arc defining parameter as input and said line model value as output, and said line model value calculation ECU calculates said line model value using said arc defining parameter calculated by said arc defining parameter calculation ECU and said travel reference line model, wherein said travel reference line is a future travel trajectory of said vehicle, and said line model value calculation ECU calculates said line model value of said future travel trajectory so that said first mode of said line model value is in parallel with an advancing direction of said vehicle and at least passes through a range in which said vehicle is present when said future travel trajectory is determined.

2. The travel reference line determination system according to claim 1, wherein said travel reference line is a boundary line of one of said track of said vehicle and a travel lane of said vehicle, and said line model value calculation ECU calculates said line model value of said boundary line so that a tangent line to said line model value extends in parallel with a central line of said vehicle and is positioned on a lateral side of said vehicle at the time when said boundary lines is determined.

3. The travel reference line determination system according to claim 1, wherein said arc defining parameter calculation ECU calculates said arc defining parameter using a plurality of said line estimate values that have been calculated in a time-series manner.

4. The travel reference line determination system according to claim 1, wherein said arc defining parameter calculation ECU evaluates a direction in which said error changes at a time when a value including said arc defining parameter changes, and calculates said arc defining parameter based on result of evaluating the direction.

5. The travel reference line determination system according to claim 4, wherein said travel reference line model is configured as a model including a signal addition parameter, obtained by adding a predetermined reference signal value to said arc defining parameter, as input and said line model value as output, said arc defining parameter calculation ECU has:
an evaluation function value calculation ECU configured to calculate an evaluation function value for evaluating said error;
a fluctuation component extraction ECU configured to extract a fluctuation component of said evaluation function value; and
a correlation value calculation ECU configured to calculate a correlation value that takes a value of zero when said error is the smallest, by subjecting a multiplication value, obtained by multiplying said fluctuation component by said predetermined reference signal value, to predetermined filtering processing, and said arc defining parameter calculation ECU calculates said arc defining parameter so that said correlation value takes a value of zero.

6. An automatic driving system comprising: said travel reference line determination system according to claim 1, wherein said automatic driving system controls a travel state of said vehicle using said travel reference line determined by said travel reference line determination system.

7. The travel reference line determination system according to claim 1, wherein the travel reference line is a curved line referenced when the vehicle travels on a curve travel lane or on a curve track including one of a curved path and a bent path.

8. The travel reference line determination system according to claim 1, further comprising an estimated track position calculation ECU configured to calculate estimated track positions of said vehicle using said track environment data, and wherein said line model value calculation ECU calculates said line model value using said estimated track positions.

9. A travel reference line determination method of determining a travel reference line that is used as a reference when a vehicle travels on a curved path and a bent path, comprising steps of:

(i) calculating, by a computer, a line model value using a travel reference line model obtained by modeling of said travel reference line, said line model value representing a first mode where said travel reference line extends;

(ii) acquiring, by the computer, track environment data representing track environment including a track of said vehicle, the track being to be traveled by the vehicle;

(iii) calculating, by the computer, a line estimate value using said track environment data, said line estimate value representing a second mode where said travel reference line extends;

(iv) calculating, by the computer, an arc defining parameter so that an error between said line model value and said line estimate value is minimized, said arc defining parameter defining an arc; and (v) determining, by the computer, said travel reference line using said arc defining parameter so that said travel reference line has an arc shape, wherein said travel reference line model is a model including said arc defining parameter as input and said line model value as output, and said step (i) calculates said line model value using said arc defining parameter and said travel reference line model, wherein said travel reference line is a future travel trajectory of said vehicle, and said step (i) calculates said line model value of said future travel trajectory so that said first mode of said line model value is in parallel with an advancing direction of said vehicle and at least passes through a range in which said vehicle is present when said future travel trajectory is determined.

10. A travel reference line determination system for determining a travel reference line that is used as a reference when a vehicle travels, comprising:

a line model value calculation ECU (Electronic Control Unit) configured to calculate a line model value using a travel reference line model obtained by modeling of said travel reference line, said line model value representing a first mode where said travel reference line extends;

a track environment data acquisition ECU configured to acquire track environment data representing track environment including a track of said vehicle, the track being to be traveled by the vehicle;

a line estimate value calculation ECU configured to calculate a line estimate value using said track environment data, said line estimate value representing a second mode where said travel reference line extends;

an arc defining parameter calculation ECU configured to calculate an arc defining parameter so that an error between said line model value and said line estimate value is minimized, said arc defining parameter defining an arc; and a travel reference line determination ECU configured to determine said travel reference line using said arc defining parameter so that said travel reference line has an arc shape, wherein said travel reference line model is a model including said arc defining parameter as input and said line model value as output, said line model value calculation ECU calculates said line model value using said arc defining parameter calculated by said arc defining parameter calculation ECU and said travel reference line model, and said arc defining parameter calculation ECU evaluates a direction in which said error changes at a time when a value including said arc defining parameter changes, and calculates said arc defining parameter based on result of evaluating the direction.

11. The travel reference line determination system according to claim 10, wherein said travel reference line model is configured as a model including a signal addition parameter, obtained by adding a predetermined reference signal value to said arc defining parameter, as input and said line model value as output, said arc defining parameter calculation ECU has:

an evaluation function value calculation ECU configured to calculate an evaluation function value for evaluating said error;

a fluctuation component extraction ECU configured to extract a fluctuation component of said evaluation function value; and a correlation value calculation ECU configured to calculate a correlation value that takes a value of zero when said error is the smallest, by subjecting a multiplication value, obtained by multiplying said fluctuation component by said predetermined reference signal value, to predetermined filtering processing, and said arc defining parameter calculation ECU calculates said arc defining parameter so that said correlation value takes a value of zero.

* * * * *